May 13, 1941. M. J. ULINE 2,242,155
ICE RECEPTACLE
Filed Aug. 3, 1938
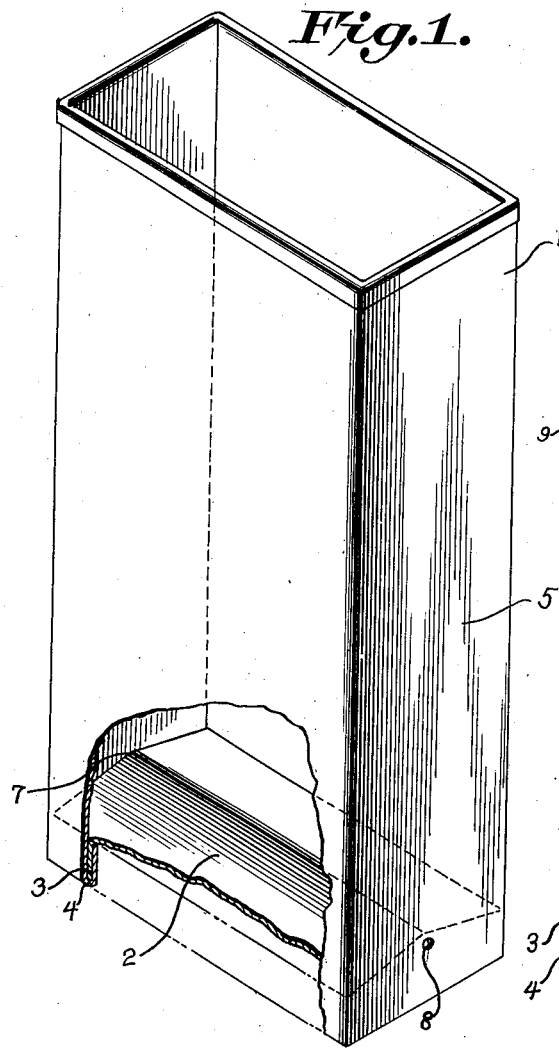
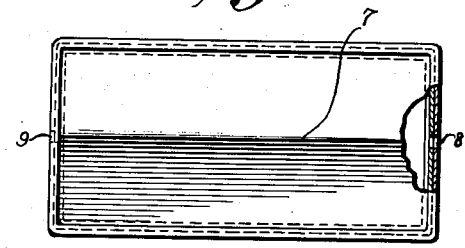
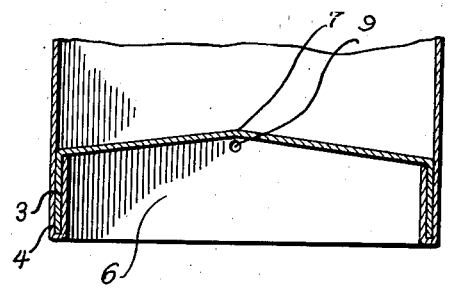
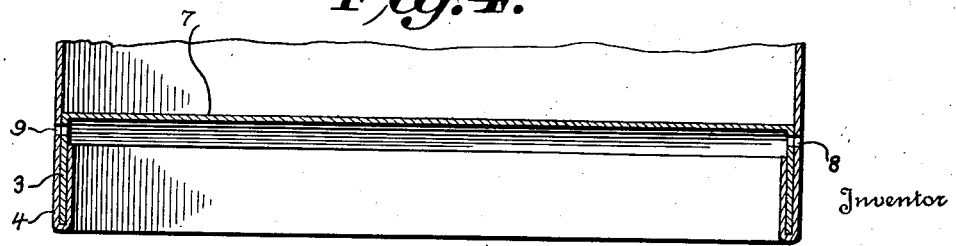
Inventor
M. J. Uline, Patented May 13, 1941

2,242,155

UNITED STATES PATENT OFFICE 2,242,155

ICE RECEPTACLE

Migiel J. Uline, Washington, D. C., assignor to The R F C Mortgage Company, Richmond, Va., a corporation of Maryland Application August 3, 1938, Serial No. 222,892

3 Claims. (Cl. 62—108)

My invention relates to receptacles of the type employed in the manufacture of artificial ice, and more particularly to a receptacle so constructed that the air trapped under the bottom of the receptacle is permitted to gradually escape without permitting the formation of large bubbles.

In the ice plants now in use, blocks of ice are manufactured by submerging sheet metal receptacles filled with water in a brine tank until their contents are frozen. These metal receptacles or cans are then removed, and, in order to quickly remove the frozen contents, are placed in a dip tank filled with hot water.

The sheet metal cans now generally used are so constructed that their bottoms are above the base of the walls of the can. This construction causes the extremities of the walls of the can to form a recess below the raised bottom.

From this description it is apparent that, when the cans are submerged in the brine or dip tank, air will be trapped in the pocket formed by the raised bottom of the can, and this air pocket prevents the brine or the hot water from coming into direct contact with the bottom of the can. This condition increases the time required for freezing the liquid within the can and also the time for melting the frozen block after it has been placed in the dip tank. Moreover, the presence of this air results in the formation of large bubbles of air which escape from the pocket from time to time, and thus cause agitation of the liquid in the brine tank and in the dip tank and, as a result, the brine or hot water frequently splashes into the contents of the can.

One of the objects of my invention is to overcome the above-mentioned disadvantages of the prior art.

Another object of my invention is to provide a metallic receptacle for ice plants, the use of which will decrease the time necessary for freezing the blocks of ice and removing them from their containers.

A further object of my invention is to provide a receptacle for freezing liquids into blocks which is so constructed that the air trapped beneath the bottom of the can is permitted gradually to escape without the formation of bubbles of large size.

With these and other objects in view, my invention embraces the concept of providing a metallic receptacle for use in holding a liquid which is to be frozen, the bottom of which is so constructed that any air which is trapped when the receptacle is submerged in a body of liquid will be gradually forced to collect due to the shape of of the bottom at one point. The side walls of this metallic receptacle are also provided with a plurality of apertures adjacent this point which permit the gradual escape of this air trapped beneath the bottom of the can.

In the drawing:

Figure 1 is a side elevational view of an ice can constructed in accordance with my invention, partly broken away to show the bottom construction.

Figure 2 is a top plan view partly broken away.

Figure 3 is a detail transverse section through a portion of the receptacle.

Figure 4 is a detail longitudinal section through a portion of the receptacle.

As best shown in Figure 1, my invention consists of a rectangular can which may be of any suitable shape and is generally designated by the numberal 1. This can 1 is provided with a bottom 2 having a marginal depending flange 3 which is arranged within a loop 4 formed of or on the lower edge of the sides 5 of the can 1. Although I have shown the bottom 2 welded within the loop 4 of the sides of the can, the bottom and sides may be held together in any suitable manner. This construction provides for a raised bottom which creates a recess 6 which is formed by the lower sides of the can and the bottom 2.

Instead of being horizontal, the bottom of the can 2 is bent upwardly by a die or other suitable means to form a ridge, indicated at 7, which may extend across the length of the receptacle 1 as shown or across its width. The ridge 7 may be located directly at the center of the receptacle as shown or may be positioned on either side of its center axis. The side walls of the receptacle 1 are provided with a pair of apertures 8 and 9 which are positioned directly below the ridge 7. By regulating the size and number of these apertures, the size of the bubbles of air escaping from the recess 6 may be regulated.

From the above description it is believed obvious that I have provided a metallic receptacle which is especially suitable for use as a container of liquids which are to be frozen. In ordinary practice, a number of these receptacles filled with liquid are submerged in a brine tank until their contents are frozen. This submerging causes a quantity of air to be trapped in the recess 6 as has previously been described. However, due to the construction of the bottom 2, this air gradually rises under the bottom 2 to a position along the ridge 7 where it escapes through the apertures 8 and 9. The size of these apertures and their number provides a means of controlling the size of the air bubble so that the escaping air will not cause the brine to be splashed into the contents of the receptacle.

After the contents of the receptacle have been frozen, they may be removed and inserted in a dip tank containing hot water so that the particles binding the frozen liquid to the receptacle may be melted and the frozen block removed from its container. This submersion in the dip tank also causes air to be trapped which is released in exactly the same manner as described in connection with the brine tank.

It is believed apparent that, by thus providing a means by which trapped air may be allowed to escape, and by regulating the size of the escaping bubbles, I have provided a receptacle which greatly increases the speed and efficiency of freezing liquids. By allowing the air to escape, not only is the oxidation of the zinc on the bottom of the cans prevented, but the transference of heat and cold to the contents of the container is hastened by eliminating the insulating properties of the pocket of air.

While for purposes of illustration I have shown one type of receptacle and only one type of bottom for this receptacle, it is obvious that various changes in both the receptacle and its bottom and the means for joining these two together may be made without departing from the spirit and scope of my invention. I, therefore, wish it understood that it is my intention only to be limited by the prior art and the scope of the appended claims.

I claim:

1. As a new article of manufacture, an ice can adapted to be immersed in a body of liquid for the manufacture of artificial ice comprising a rectangular body, a bottom secured therein and spaced from the lower edge thereof, the said body and bottom portions thereby forming a pocket beneath the bottom portion, the upper portion of said pocket being bounded by a ridged structure having downwardly sloping sides which forms the said bottom portion, said ridge extending completely across said bottom and being formed by bending the bottom downwardly along its center line, the bent portion of the bottom forming the highest point within the pocket and each of its ends registering with a vent opening, said openings consisting of apertures through opposed walls of the can positioned directly beneath the ridge.

2. As a new article of manufacture, an ice can adapted to be immersed in a body of liquid for the manufacture of artificial ice, comprising a rectangular body having its lower edge turned inwardly and upwardly to form an open-ended loop, a bottom arranged within said body to form a pocket under the bottom, said bottom having a marginal depending flange which is secured in said loop, the upper portion of said pocket being bounded by a ridged structure having sloping sides which forms the said bottom portion, said ridge extending completely across the pocket and being formed by bending the center portion of the bottom downwardly along its center line, the ridge forming the highest point of the pocket and each of its ends registering with a vent opening, said openings consisting of apertures through the opposed walls of the can and said apertures being positioned at a point beneath the ridge.

3. As a new article of manufacture, an ice can adapted to be immersed in a body of liquid for the manufacture of artificial ice comprising a rectangular body, a bottom portion secured therein and spaced from the lower edge thereof, the said body and bottom portions thereby forming a recess beneath the bottom portion, the said bottom portion being composed of two flat surfaces lying in different planes, said surfaces intersecting at the center of the bottom portion to form a ridge, said ridge extending completely across the said container and forming the highest point within the recess, and each of the ends of the said ridge registering with a vent opening, said openings consisting of apertures through opposed walls of the can positioned directly beneath the ridge.

MIGIEL J. ULINE.